(12) United States Patent
Wimmer

(10) Patent No.: US 10,644,538 B2
(45) Date of Patent: May 5, 2020

(54) IEC 61850 SUBSTATION GATEWAY

(75) Inventor: Wolfgang Wimmer, Rietheim (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 13/414,312

(22) Filed: Mar. 7, 2012

(65) Prior Publication Data
US 2012/0233296 A1 Sep. 13, 2012

(30) Foreign Application Priority Data

Mar. 7, 2011 (EP) ..................................... 11157128

(51) Int. Cl.
*G06F 15/177* (2006.01)
*H02J 13/00* (2006.01)

(52) U.S. Cl.
CPC ......... *H02J 13/0086* (2013.01); *Y02E 60/723* (2013.01); *Y02E 60/724* (2013.01); *Y02E 60/7869* (2013.01); *Y04S 10/16* (2013.01); *Y04S 10/18* (2013.01); *Y04S 40/128* (2013.01)

(58) Field of Classification Search
CPC .......................... G06F 15/177; H04L 29/06013
USPC .................................................. 709/220–222
See application file for complete search history.

(56) References Cited

U.S. PATENT DOCUMENTS

| | | | |
|---|---|---|---|
| 2005/0188259 A1* | 8/2005 | Zweifel | G06F 8/658 714/23 |
| 2006/0007858 A1* | 1/2006 | Fingerhut et al. | 370/229 |
| 2009/0327583 A1* | 12/2009 | Simonson | G06F 3/0607 711/103 |
| 2010/0020724 A1 | 1/2010 | Wimmer et al. | |
| 2012/0099478 A1* | 4/2012 | Fu | H02J 13/00 370/254 |

FOREIGN PATENT DOCUMENTS

| | | |
|---|---|---|
| CN | 102027656 | 4/2011 |
| EP | 2 193 590 B1 | 9/2007 |
| EP | 1 976 218 A1 | 10/2008 |

(Continued)

OTHER PUBLICATIONS

Search Report dated Jul. 22, 2011, by European Patent Office for Application No. 11157128.7.

(Continued)

*Primary Examiner* — Vivek Srivastava
*Assistant Examiner* — Sibte H Bukhari
(74) *Attorney, Agent, or Firm* — Taft Stettinius & Hollister LLP; J. Bruce Schelkopf

(57) ABSTRACT

An IEC 61850 Network Control Center (NCC) server is provided at a gateway intelligent electronic device (IED) of a Substation Automation (SA) system. The NCC server serves, via the MMS/TCP/IP part of IEC 61850, process data from substation Intelligent Electronic Devices IEDs to a NCC. The NCC server uses functional names for gateway Logical Nodes (LN) corresponding to substation LNs. The functional names are devoid of any reference to a substation IED related name of the substation LNs, but can be automatically translated to substation IED related names in case of changing SA communication and substation IED architecture. Thereby, functional names as defined by the substation section within a SCD file of the SA system are used for the communication link between the gateway IED and the NCC.

8 Claims, 2 Drawing Sheets

(56) References Cited

FOREIGN PATENT DOCUMENTS

| WO | WO 2009/046732 A2 | 4/2009 |
|---|---|---|
| WO | WO 2010/034335 A1 | 4/2010 |

OTHER PUBLICATIONS

Wimmer, "Designing IEC 61850 systems for maintenance, retrofit and extension", PAC World, 2008, pp. 46-51.

De Mesmaeker et al., "Practical considerations in applying IEC 61850 for Protection and Substation Automation Systems", GCC Power 2005 Conference and Exhibition, Nov. 2005.

Brand, "The Standard IEC 61850 as Prerequisite for Intelligent Applications in Substations", Power Engineering Society General Meeting, Jun. 2004, pp. 714-718.

Wimmer, "IEC 61850 SCL—More Than Interoperable Data Exchange Between Engineering Tools", 15th PSCC, Aug. 2005, pp. 1-5, Session 13, Paper 2.

Wimmer, "Engineering a system of systems", PAC world conference, 2010.

Henry Dawidczak, et al., Functional Naming in IEC 61850—Prinzip and Anwendungen, pp. 66-70, 2008.

Dr. Wolfgang Wimmer, "Designing IEC 61850 systems for maintenance, retrofit and extension", pp. 46-51, ABB Switzerland, Spring, 2008.

Heiko Englert et al., "IEC 61850 Substation to Control Center Communication—Status and Practical Experiences from Projects", pp. 1-6, 2009, IEEE Bucharest Power Tech Conference, Romania.

H. Dawidczak et al., "Template Based Engineering of Substation Automation Systems with the IEC 61850 Functional Naming Concept", pp. 1-6, 16$^{th}$ PSCC, Glasgow, Scotland, Jul. 14-18, 2008.

Wolfgang Maerz, Seamless Telecontrol Communication Architecture (sTCA), pp. 1-4, Dortmund, Germany, Aug. 14, 2001.

"Communication networks and systems in substations", International Standard, Jul. 2003, First edition, IEC 61850-7-1, Siemens AG.

\* cited by examiner

```xml
<Header id="sct" version="1.2" toolID="SCT" nameStructure="IEDName" />
<Substation name="Musteranlage">
<VoltageLevel name="E1">
<Voltage unit="V" multiplier="k">110</Voltage>
<Bay name="Abgangsfeld Q3">
<ConductingEquipment name="QB1" virtual="false" type="DIS">
<LNode lnClass="XSWI" iedName="PROXYGW" lnType="m_XSWI" lnInst="1" ldInst="MusteranlageE1Abgangsfeld Q3" prefix="QB1" >
</LNode>
<LNode lnClass="CSWI" iedName="PROXYGW" lnType="E3_CSWI" lnInst="1" ldInst="MusteranlageE1Abgangsfeld Q3" prefix="QB1" >
</LNode>
<LNode lnClass="CILO" iedName="PROXYGW" lnType="m_CILO" lnInst="1" ldInst="MusteranlageE1Abgangsfeld Q3" prefix="QB1" >
</LNode>
<Terminal name="T1" connectivityNode="Musteranlage/E1/Abgangsfeld Q3/L5" substationName="Musteranlage"
  voltageLevelName="E1" bayName="Abgangsfeld Q3„ cNodeName="L5" />
<Terminal name="T2" connectivityNode="Musteranlage/E1/Abgangsfeld Q3/L2„ substationName="Musteranlage"
  voltageLevelName="E1" bayName="Abgangsfeld Q3„ cNodeName="L2" />
</ConductingEquipment>
<ConductingEquipment name="QB2" virtual="false" type="DIS">
<LNode lnClass="XSWI" iedName="PROXYGW" ldInst="MusteranlageE1Abgangsfeld Q3" lnType="m_XSWI" lnInst="1" prefix="QB2" >
</LNode>
<LNode lnClass="CSWI" iedName="PROXYGW" lnType="E3_CSWI" ldInst="MusteranlageE1Abgangsfeld Q3" lnInst="1" prefix="QB2" >
</LNode>
<LNode lnClass="CILO" iedName="PROXYGW" lnType="m_CILO" ldInst="MusteranlageE1Abgangsfeld Q3" lnInst="1" prefix="QB2" >
</LNode>
```

Fig. 3

IEC 61850 SUBSTATION GATEWAY

RELATED APPLICATION

This application claims priority under 35 U.S.C. § 119 to European Patent Application No. 11157128.7 filed in Europe on Jul. 3, 2011, the entire content of which is hereby incorporated by reference in its entirety.

FIELD

The present disclosure relates to the field of Substation Automation (SA) systems for operating substations in high and medium voltage power networks, and more particularly, to communication connections between a SA system and a Network Control Center (NCC).

BACKGROUND INFORMATION

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system includes secondary devices, so-called Intelligent Electronic Devices (IED), which are responsible for protection, control and monitoring of the primary devices. The IEDs may be assigned to hierarchical levels, for example, the station level, the bay level, and the process level, the latter being separated from the bay level by a so-called process interface. The station level of the SA system includes an Operator Work Station (OWS) with a Human-Machine Interface (HMI) and a gateway to a Network Control Center (NCC).

A communication standard for communication between the secondary devices of a substation has been introduced by the International Electrotechnical Committee (IEC) as part of the standard IEC 61850 entitled "Communication Networks and Systems In Substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media.

SA systems based on IEC 61850 are configured and described by means of a standardized configuration representation or formal system description called Substation Configuration Description (SCD). An SCD file includes the logical data flow between the IEDs on the basis of message types or data sets, for example, for every message source, a list of destination or receiver IEDs, the message size in terms of data set definitions, as well as the message sending rates for all periodic traffic. The SCD file likewise includes the relationship between the IEDs as well as the functionality which the IEDs execute on behalf of the substation process or switch yard. SA systems with IEC 61850 have different architectures and different ways of allocating functionality to Logical Devices (LD) or to physical devices (IEDs). The names of some IEDs are even dependent on the IED manufacturer and/or the IED purpose.

In order to interconnect IEC 61850 IEDs within the substation to an IEC 61850 NCC, the TCP/IP based client server part of the IEDs and the NCC can directly be used across any wide area network. However, this implies separate permanent TCP/IP connections to each individual IED inside the SA system and extensive resources and management at the NCC side, and makes the NCC configuration highly dependent on the IED architecture within the substation. Furthermore, means for switching control access between substation level and NCC level (e.g., between local and remote) must be implemented on all SA IEDs.

As an alternative, the use of a gateway from the SA side IEC 61850 bus to the NCC side IEC 61850 protocol has been recommended. Such a gateway operates as an IEC 61850 client to all those IEDs supplying process data (such as primary equipment status, e.g. switch position, or primary equipment supervision data e.g. gas alarms) intended for the NCC, and as an IEC 61850 server to the NCC for providing any process data changes in a configurable and controlled way via the MMS/TCP/IP part of IEC 61850. The gateway requires a configuration related to the SA system and its communication system on one side, and to the needed signals and signal qualities at the NCC on the other side. One simple method of configuring the server side of the gateway is to instantiate proxy Logical Devices (LD) for all the LDs on the substation IEDs to the NCC side of the gateway. This leads to a simple gateway configuration and also testing process; however, it makes the NCC communication link dependent on the IED related naming and the physical as well as logical device structure within the substation.

On the other hand, for the NCC, a substation related functional view based on the primary substation single line layout and corresponding equipment and functions may be beneficial. Such functional structure changes much less than the physical structure inside the secondary SA system, and might even to a large extent be known before the design of the SA system is finalized. Likewise, later extensions of the primary part of the substation and the corresponding functionality might be known long before the specific IEDs for the implementation have been determined.

In this context, the principles and methods of the present disclosure are by no means restricted to a use in substation automation, but are likewise applicable to related process control systems with a formal system description. In particular, it has to be noted that IEC 61850 is also an accepted standard for Hydro power plants, Wind power systems, and Distributed Energy Resources (DER). Further, it is also applicable to other protocols, as long as there is a formal description of the signal meaning, like for IEC 60870-5-101/104 according to IEC 61850-80-1.

SUMMARY

An exemplary embodiment of the present disclosure provides a gateway intelligent electronic device (IED) for a Substation Automation (SA) system automating an electric power substation. The exemplary gateway IED includes a communication interface configured to communicate according to IEC 61850, via a substation communication network, (i) with a substation Intelligent Electronic Device IED hosting a substation Logical Node (LN) instance with a substation IED related name, and, via an Network Control Center (NCC) server of the gateway IED, (ii) with a NCC. The NCC server is configured to host a gateway LN instance corresponding to the substation LN instance and has an NCC related name independent of the substation IED related name.

An exemplary embodiment of the present disclosure provides a method of configuring a gateway intelligent electronic device (IED) for communication according to IEC 61850. The exemplary method includes configuring the gateway IED to communicate according to IEC 61850, via a substation communication network of a Substation Automation (SA) system, with a substation Intelligent Electronic Device IED hosting a substation Logical Node LN instance with a substation IED related name. The exemplary method also includes configuring the gateway IED to communicate according to IEC 61820, via an Network Control Center (NCC) server of the gateway IED, with a NCC. In addition, the exemplary method includes determining a functional name of the substation LN instance that is independent of the substation IED related name, and configuring the NCC server by instantiating a gateway LN instance corresponding to the substation LN instance and having an NCC related name based on the functional name.

BRIEF DESCRIPTION OF THE DRAWINGS

Additional refinements, advantages and features of the present disclosure are described in more detail below with reference to exemplary embodiments illustrated in the drawings, in which:

FIG. 3 is an excerpt of an SCL file with a formal configuration description of a gateway, according to an exemplary embodiment of the present disclosure.

DETAILED DESCRIPTION

It is an objective of the disclosure to facilitate IEC 61850 based communication between Intelligent Electronic Devices (IED) of a Substation Automation (SA) system and a Network Control Centre (NCC). This objective is achieved by a gateway IED and a method of configuring a gateway IED according to the exemplary embodiments described below.

According to an exemplary embodiment of the present disclosure, an IEC 61850 NCC server for serving, via the MMS/TCP/IP part of IEC 61850, process data from substation IEDs to the NCC is provided at a gateway IED of the SA system. The NCC server uses functional names for gateway Logical Nodes (LN) corresponding to substation LNs instantiated on the substation IEDs. With the exception of the generic LN class, the functional names are devoid of any reference to a substation IED related name as defined in IEC 61850-6, but can be automatically translated to substation IED related names in case of changing SA communication and substation IED architecture. In other words, functional names as defined by the substation section within a SCD file of the SA system are used for the communication link between the gateway IED and the NCC.

The proposed NCC server naming technique keeps the configuration of the substation function related data at the NCC-side of the gateway independent from the substation IED related structure or implementation inside the SA system. Hence, in case of changes or retrofit at the SA system, a reconfiguration of the SA-side of the gateway will be sufficient. Furthermore, it will be possible to configure the IEC 61850 communication link between the gateway IED and the NCC before the SA system as such is designed, and to commission this link independently of the commissioning of the SA system.

Figure 1:
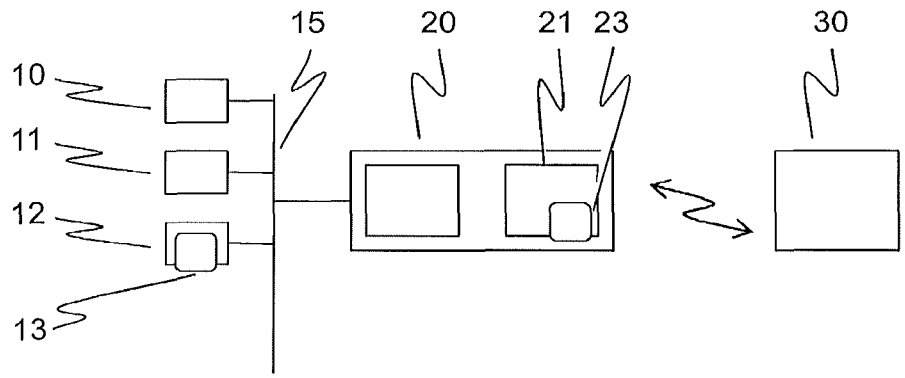
FIG. 1 depicts a gateway interconnecting substation IEDs and a Network Control Center (NCC) according to an exemplary embodiment of the present disclosure.

The present disclosure also relates to a non-transitory computer-readable recording medium (e.g., a non-volatile memory) having a computer program including computer program code tangibly recorded thereon for controlling one or more processors of a) a gateway IED or other device adapted to be connected to a communication network of an SA system and configured to communicate with a substation IED and with a NCC, or b) of an IEC 61850 engineering tool of the NCC communication system for generation of an IEC 61850 IID file of the gateway IED or other device, to carry out the features of the exemplary embodiments described herein. the FIG. 1 depicts a Substation Automation (SA) system with three substation Intelligent Electronic Devices (substation IEDs) 10, 11, 12, and a gateway IED 20 connected to a substation communication system or station bus 15. The gateway IED 20 is communicatively connected to a Network Control Centre (NCC) 30. On a NCC-side or -end, the gateway IED 20 includes an IEC 61850 NCC server 21 for conveying status signals, events, alarms, measurements and disturbance recordings from the SA system to the NCC. An exemplary substation Logical Node (LN) instance 13 is hosted by substation IED 12, and a corresponding proxy LN instance 23 resides on NCC server 21.

As noted by W. Wimmer in "Engineering a System of Systems", paper 43 presented at the PAC world conference 2010, Dublin, IE, the Substation Configuration Description (SCD) file of a SA system provides, in the substation section within the SCD file where LN instances are allocated to the functional elements or pieces of primary equipment in the substation structure, for a translation between the LN instance names on the substation IEDs and functional names that relate to the configuration or design of the substation.

Figure 2:
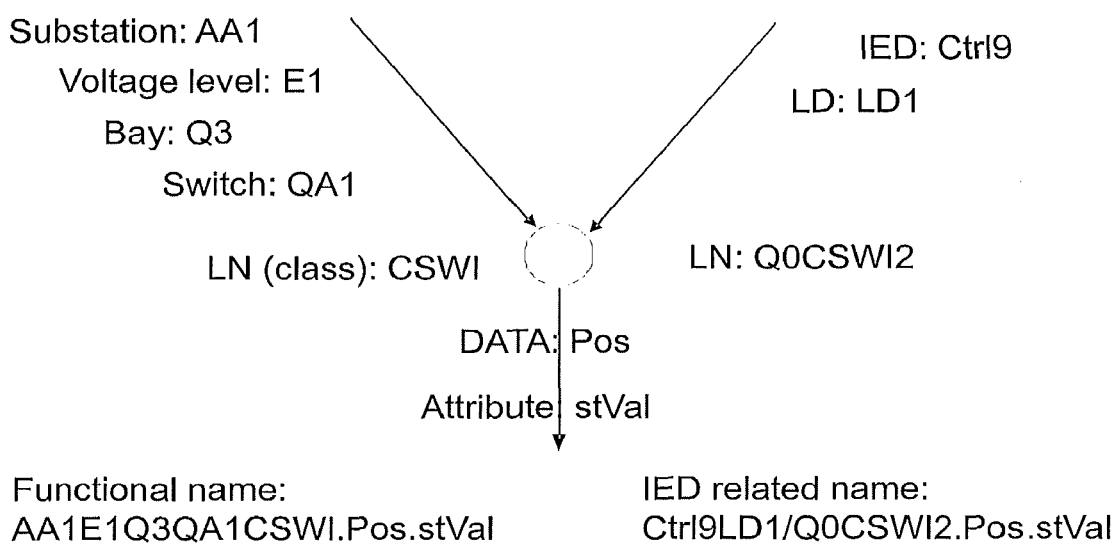
FIG. 2 depicts the relation between functional and IED related names in IEC 61850, according to an exemplary embodiment of the present disclosure.

FIG. 2 depicts such a correspondence between a functional name and a substation IED related name for an exemplary substation LN instance. The functional name AA1E1Q3QA1CSWI.Pos.stVal includes the substation designation (AA1), the voltage level (E1), the bay designation (Q3), the primary equipment (e.g., switch) designation (QA1) as well as the Logical Node (LN) class (CSWI), LN data (Pos) and LN attribute (stVal). The corresponding substation IED related name Ctrl9LD1/Q0CSWI2.Pos.stVal includes the IED name (Ctrl9), the Logical Device (LD) name (LD1), the LN (CSWI) including LN prefix (Q0) and LN instance number (2).

In known techniques, an exemplary gateway or proxy LN instance instantiated on a gateway IED named "AA1Y1" and corresponding to the above substation LN instance has a default NCC related name "AA1Y1LD1/Q0CSWI2" that retains a reference to the substation IED related name via the LD instance identification "LD1", the LN prefix "Q0" and the LN instance number "2". In any case, and by means of the functional name (AA1E1Q3QA1CSWI), a SA-side SCD file (referencing the substation IED related name Ctrl9LD1/Q0CSWI2) can automatically be translated into an NCC-side SCD file (referencing the NCC related name AA1Y1LD1/Q0CSWI2), which ultimately supports automated engineering of the entire SA system. However, even if the engineering process as such can be automated, the communication link between the gateway and the NCC has to be newly configured and tested after any IED related change inside the substation at the gateway as well as at the NCC side, because any such change is likely to impact the reference to a substation IED related name of at least one gateway LN instance.

According to an exemplary embodiment of the present disclosure, functional names as defined by the substation section within a SCD file of the SA system are used for the communication link between the gateway IED and the NCC.

Such functional name needs to be mapped, or cast, into a proper format in order to become a valid NCC related name for an IEC 61850 gateway LN instance. Hence, the functional name AA1E1Q3QA1CSWI of the above exemplary LN instance is mapped, for example, by the gateway engineering tool for the NCC-side of the gateway IED, to the generic IEC 61850 gateway IED related name parts, including gateway IED name, LD instance ID (or alternatively the LD name, which per default is the concatenation of the gateway IED name and the LD instance ID), LN prefix and LN instance number. The specific mapping to these parts has to be agreed on, and needs to respect the naming length restrictions of IEC 61850 (Edition 2), for example, 64 characters for the LD name and 11 characters for the LN prefix (with the LN instance number fixed to 1).

A simple way of assigning the functional name to the LD name and LN prefix at the NCC-side can include the following rules:

1. The name of the hierarchically lowest functional level (according to the substation section of the SCD file of the SA system) to which an LN instance is assigned or attached is used as the LN prefix.

2. The concatenation of all names of all the functional levels above the functional level to which the LN instance is assigned is used as LD instance identification or as LD name, which in IEC 61850 edition 2 can be defined independently from the IED name and the LD instance identification.

At present, seven functional levels (substation/voltage level/bay/function/subfunction/equipment/subequipment) are defined, implying that the name length at each level for an edition 2 gateway can amount to 64/7=9 characters. An exemplary length for the alphanumeric part of any IEC 81346 identification is 3 characters; in case of one additional sublevel 6 characters. This means that any typical IEC 81346 functional naming scheme can be mapped in this way without any problem. In most cases, even an additional IED name (e.g. using the generated name as LD instance ID instead of LD name) is no problem. In this context, it is understood that all functional names are unique, for example, at any functional level of the substation structure only one instance of a specific LN class is allowed.

In rule 2 above, using LD instance instead of LD name establishes the IED name as distinguishing identification element between different substations, in case the substation names themselves are not unique against each other in the scope of the NCC.

In the example shown in FIG. 2, the LD related name part is AA1E1Q3, and the LN prefix QA1 (the name of the functional level "function"). With the gateway IED named AA1Y1 the following two communication level (MMS domain) NCC related name variants for the switch position are possible:

1. Mapping to IED name/LD instance: AA1Y1AA1E1Q3/QA1CSWI1
2. Mapping to LD name: AA1E1Q3/QA1CSWI1

If it is important to distinguish different gateways providing the same functional data items, the first method is recommended, which however shortens the usable length for the SA function related name part.

FIG. 3 lists an excerpt of an IEC 61850 Instantiated IED Description (IID) file of a gateway according to an exemplary embodiment of the present disclosure. In detail, the two disconnectors "QB1" and "QB2" (bold-type emphasis added for the sake of legibility) in bay "Abgangsfeld Q3" of voltage level "E1" of substation "Musteranlage" are each controlled via three LNs "XSWI", "CSWI", "CILO". The corresponding proxy LNs on gateway IED "PROXYGW" have the LN prefix "QB1" and "QB2", respectively, indicating the hierarchical functional level of the two disconnectors, as well as the LD instance "MusteranlageE1Abgangsfeld Q3"

Using the above mapping mechanism implies that the NCC server names of the data may be already determined from the functional specification of the data to be provided on this link, the latter, for example, being part of the substation section of a System Specification Description (SSD) SCL file, where no IED specific name parts are used. A gateway IID file as in FIG. 3 for the NCC link describing the NCC server configuration can be created from this SSD file, without any knowledge about the substation IEDs which will implement it.

Once the SA engineering is completed, the SA-side of the gateway will be configured from the complete SCD file, which includes the original substation description from the SSD file and, in addition, the substation IEDs of the SA system, the links from the substation section to the LNs on the substation IEDs as well as the configured data flow from the substation IEDs to the gateway IED. A consistency check of the SCD file with the already existing gateway IID file can be done by verifying that all specified LN instances are actually assigned to a substation IED. In case of inconsistencies, the gateway IID file can be generated or completed from the SA SCD file, or specific NCC-side quality attributes may be set to invalid. If any additional bays are added, the gateway IED can first be reconfigured at the SA-side, still allowing the NCC to access the 'old' part before the NCC-side is enhanced; or the NCC-side can first be reconfigured, providing the NCC-side configuration from the SSD file of the new bay before the SA part of this bay will be designed and commissioned.

Each substation LD residing on a substation IED includes a dedicated Logical Node LN0 to commonly manage all LNs on this LD and also to manage protection setting groups. On the other hand, there is no strict correspondence between function and IED oriented substation LDs and the generated LD structure on the gateway IED. Hence, the LD management at the NCC-side is unrelated to any LD management in the SA system, in particular and with a certain benefit to security concerns, setting group management cannot be handled from the NCC in a straightforward manner.

The basic functionality of a gateway to NCC is to provide access to the substation function related data, especially to the switch yard status, and to enable control of the latter by the NCC. Furthermore, the gateway may provide supervisory data about the substation IEDs of the SA system. The supervisory data may be provided by the L logical nodes on the substation IED, for example, LLN0 and LPHD as a minimum. Hence, a proxy image of the substation IEDs might still be needed for this purpose, yet its contents can be restricted to one LD per physical substation IED containing the needed L logical nodes. In particular, LLN0 and LPHD of the root logical devices, for example, allow for substation IED supervision as well as for the switching of protection setting groups if needed and secured by other means. The latter purpose could even be done via the functional modelling of protection, if the LLN0 containing the setting group control block is allocated to the appropriate protection function in the SCL substation function structure.

In case that additionally engineering or asset management functionality requires remote access to the substation IEDs, the gateway could provide a routing function with firewall and access control for direct access to the concerned protection IEDs. Alternatively, asset management access could be provided via the functional view, at least for switch gear, thus also having the asset management model independent from the IEDs providing the data. However, in this case, the needed values will probably not be provided spontaneously by IEC 61850 reporting, as may be done for the operational data, but instead (with exception of alarms to be urgently handled, which may also go to the NCC) polled on demand by the asset management system respective the asset manager. Thus, the gateway needs not just event based updating, but also transparent read requests from the NCC side to the appropriate LNs at the SA side.

The method of a functional name related server structure to NCC can also be used, if the SA system is internally using another protocol than 61850, for example, DNP 3 or IEC 101/104 resp. IEC 103. It is in these cases especially advantageous if IEC 61850 SCL descriptions (ICD files) for the DNP/101/104/103 IED exist, as then standard IEC 61850 system tools can be used to create the basic SCD file.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A gateway intelligent electronic device (IED) for a Substation Automation (SA) system automating an electric power substation, the gateway IED comprising:
   a processor and memory; and
   a communication interface of the gateway intelligent electronic device (IED) configured to communicate according to IEC 61850, via a substation communication network, (i) with a substation IED hosting a substation Logical Node (LN) instance with a substation IED related name, and, via an Network Control Center (NCC) server of the gateway IED, (ii) with a NCC,
   wherein the NCC server is configured to host a gateway LN instance corresponding to the substation LN instance and having an NCC related name based on a functional name that is devoid of any reference to the substation IED related name but automatically translatable into the substation IED related name in case of changing SA communication and substation IED architecture, wherein the functional name is retrieved from a substation section of a System Specification Description (SSD) file, the LN instances providing data objects relevant to NCC applications are identified from the SSD file of the SA system, a functional name for each identified LN is retrieved from the substation section of the SSD file, and the NCC related name being independent of the substation IED related name.

2. The gateway IED according to claim 1, wherein the NCC related name of the gateway LN instance includes a hierarchically lowest functional level to which the substation LN instance is assigned as an LN prefix of the NCC related name.

3. The gateway IED according to claim 1, wherein the gateway LN instance includes only data objects which are relevant to NCC applications.

4. The gateway IED according to claim 1, wherein the NCC server is configured to host a proxy IED instance corresponding to the substation IED, and includes a LN providing supervisory data of the substation IED.

5. A method of configuring a gateway intelligent electronic device (IED) for communication according to IEC 61850, the method comprising:
   providing the gateway IED comprising a processor and memory;
   configuring the gateway IED to communicate according to IEC 61850, via a substation communication network of a Substation Automation (SA) system, with a substation Intelligent Electronic Device IED hosting a substation Logical Node LN instance with a substation IED related name;
   configuring the gateway IED to communicate according to IEC 61850, via an Network Control Center (NCC) server of the gateway IED, with a NCC;
   determining a functional name of the substation LN instance that is based on a functional name that is devoid of any reference to the substation IED related name but automatically translatable into the substation IED related name in case of changing SA communication and substation IED architecture, and the NCC related name being independent of the substation IED related name; and
   configuring the NCC server by instantiating a gateway LN instance corresponding to the substation LN instance and having an NCC related name based on the functional name,
   wherein the determining the functional name comprises, retrieving from a substation section of a System Specification Description (SSD) file of the SA system, a functional name for each identified LN, identifying, from the SSD file of the SA system, the LN instances providing data objects relevant to NCC applications, and retrieving, from the substation section of the SSD file, a functional name for each identified LN.

6. The method according to claim 5, comprising:
   identifying a hierarchically lowest functional level to which the substation LN instance is assigned; and
   defining a LN prefix of the NCC related name of the gateway LN instance based thereupon.

7. The method according to claim 5, comprising:
   upon a change in the SA system, reconfiguring only an SA side of the gateway.

8. A gateway intelligent electronic device (IED) for a Substation Automation (SA) system automating an electric power substation, the gateway IED comprising:
   a processor and memory; and
   a communication interface of the gateway intelligent electronic device (IED) to communicate according to IEC 61850, via a substation communication network, (i) with a substation IED hosting a substation Logical Node (LN) instance with a substation IED related name, and, via an Network Control Center (NCC) server of the gateway IED, (ii) with a NCC,
   wherein the NCC server is configured to host a gateway LN instance corresponding to the substation LN instance and having an NCC related name determined from a functional name without any knowledge about the substation IED name, wherein the functional name is automatically translatable into the substation IED related name in case of changing SA communication and substation IED architecture, wherein the NCC related name has no substation IED specific name parts, and wherein the functional name is retrieved from a substation section of a System Specification Description (SSD) file, the LN instances providing data objects relevant to NCC applications are identified from the SSD file of the SA system, a functional name for each identified LN is retrieved from the substation section of the SSD file, and the NCC related name being independent of the substation IED related name.

* * * * *